United States Patent [19]

Rochereau et al.

[11] Patent Number: 5,311,281
[45] Date of Patent: May 10, 1994

[54] INTERFEROMETER GYROSCOPE WITH ELECTRO-OPTICAL MODULATION AND REDUCED RESET FREQUENCY

[75] Inventors: Jacques Rochereau, Argenteuil; Claude Leclerco, Nesles La Vallee, both of France

[73] Assignee: Societe D'Applications Generales D'Electricite, Paris, France

[21] Appl. No.: 918,856

[22] Filed: Jul. 27, 1992

[30] Foreign Application Priority Data

Jul. 25, 1991 [FR] France .................. 9109447

[51] Int. Cl.$^5$ .......................... G01C 19/72
[52] U.S. Cl. ............................... 356/350
[58] Field of Search ............ 356/350, 345; 385/12, 385/14

[56] References Cited

U.S. PATENT DOCUMENTS 5,056,919  10/1991  Arditty et al. ............ 356/350
5,137,357  8/1992   Ferrar et al. ............. 356/350

FOREIGN PATENT DOCUMENTS 0463594  1/1992  European Pat. Off. ........... 356/350
3123163  1/1983  Fed. Rep. of Germany ...... 356/350

Primary Examiner—Samuel A. Turner
Attorney, Agent, or Firm—Larson and Taylor

[57] ABSTRACT

The gyroscope is based on the Sagnac effect and comprises a coiled dielectric waveguide, a source of electromagnetic waves provided with a splitter for sending two contrarotating waves from the source round the ring and an interference detector receiving the contrarotating waves. An electro-optical modulator is controlled to impart periodic alternating and symmetrical phase modulation to the waves at a period that is substantially twice the travel time in the waveguide. The modulator is placed upstream from the waveguide for one wave and downstream for the other. A second modulator receives the output of a phase shift sawtooth generator of adjustable slope and is placed upstream from the waveguide for one wave and downstream for the other. An electronic measurement circuit controls the direction and the value of the slope of the sawtooth to cancel the phase difference of the waves received by the interference detector. The circuit reverses the slope of the phase shift sawtooth whenever the phase shift exceeds $+\pi/2$ or is beyond $-\pi/2$, and algebraically sums the changes in the sign of the sawtooth.

5 Claims, 3 Drawing Sheets

INTERFEROMETER GYROSCOPE WITH ELECTRO-OPTICAL MODULATION AND REDUCED RESET FREQUENCY

The invention relates to gyroscopes of the type comprising: a dielectric waveguide in a ring; a source of electromagnetic waves provided with a splitter for sending two contrarotating waves from the source round the ring; an interference detector receiving the contrarotating waves; first electro-optical means controlled to impart periodic alternating and symmetrical phase modulation to the waves at a period that is substantially twice the travel time round the ring, which means are placed upstream from the ring for one wave and downstream for the other; second means receiving output from a phase shift sawtooth generator of adjustable slope placed upstream from the ring for one wave and downstream from the ring for the other; and electronic looping and measuring means controlling the direction and the value of the slope of the sawtooth to cancel the phase shift of the waves received by the interference detector.

There exist very many documents describing gyroscopes of the above-defined type in which the dielectric waveguide is generally an optical fiber constituting a coil having several hundreds of turns. These gyroscopes are based on the Sagnac effect: when two contrarotating and linearly polarized waves coming from the same source are injected into a fiber coil and are then combined at a detector, the optical path lengths are equal when the gyroscope is stationary. The power received by the detector is then at a maximum. In contrast, if the coil is rotating at an angular velocity 0 about its axis, then the waves follow two different optical paths giving rise to a phase shift $\phi_s$:

$$\phi_s = (4\pi L R)\Omega/\lambda_0 c_0$$

where L is the total length of the fiber, R is the radius of the coil, $\lambda_0$ is the wavelength in a vacuum, and $c_0$ is the velocity of light in a vacuum.

The instantaneous power P received by the detector is then:

$$P = \tfrac{1}{2} P_0 (1 + \cos \phi_s)$$

where $P_0$ is the power received in the absence of rotation.

A gyroscope designed to provide $\phi_s$ merely by measuring $P/P_0$ would be unusable in practice. Gyroscopes of the abovedefined type avoid two major defects of the theoretical arrangement.

A first defect is due to the fact that $P/P_0$ varies very little and in non-linear manner since $\cos \phi_s$ varies little when $\phi_s$ is close to zero. The above-mentioned first electrooptical means of the gyroscope move the measurement point to a zone where the scale factor is high and where the variation in the signal as a function of angular velocity is substantially linear. These modulator means receive a modulation signal, often called a "dither" signal, at a period that is about twice the travel time $\tau$ round the ring (i.e. the propagation time in the optical fiber) with an amplitude that corresponds approximately to phase variation of $\pi/2$. Because of the propagation along the fiber, this phase shift is applied initially to one of the waves and subsequently to the other wave, since the modulation means are placed upstream from the fiber for one of the waves and downstream for the other. The gyroscope is thus alternately polarized substantially to the half-intensity point on either side of the maximum of the interference fringe.

A second fault is that in its basic configuration, the gyroscope is not a zero apparatus. In gyroscopes of the above-defined type, this fault is avoided by imparting a nonreciprocal phase shift, i.e. a phase shift that does not have the same effect on the two contrarotating waves, giving a phase shift of $\phi_r$ between the two waves so that $\phi_s + \phi_r = 0$. The "regulating" phase shift $\phi_r$ is generated using a linear phase shifting sawtooth applied to integrated optics phase shifting sawtooth means placed upstream from the ring for one of the waves and downstream for the other. The sawtooth is adjustable so that $\phi_s + \phi_r$ cancels. The phase of one of the waves is thus offset before going round the coil while the phase of the other is offset after it has travelled round the coil, thereby giving rise to a phase shift between the waves that is equal to the difference between two identical sawteeth that are offset in time by the travel time round the ring.

The phase shift $\phi_r$ between the two waves that is caused by the linear sawteeth that are offset by the propagation time $\tau$ along the fiber is constant and proportional to the slope of the sawtooth, whose direction depends on the sign of the input velocity $\Omega$.

In existing gyroscopes of the above-defined type, the sawtooth is reset to zero at the end of each time interval corresponding to a change of $2\pi$ in the regulating phase, thereby reducing the measurement of angular velocity $\Omega$ to measuring the frequency f of the resets. The slope of the sawtooth is adjusted so that $\phi_s + \phi_r = 0$, and thus so that $\phi_s = 2\pi\tau/T$. The reset frequency is then $2R\Omega/n\lambda_0$. It then suffices merely for the sawtooth generator to provide a signal each time there is a reset on one output for one direction of rotation and on another output for the other direction of rotation. The velocity is thus made available by measuring the frequency or by counting the number of pulses that appear on one or other of the outputs per unit of time.

This mode of operation is illustrated in FIG. 1 which shows the change in phase shift as a function of the velocity $\Omega$ when operating with an open loop. The modulation signal, when transposed to velocity, corresponds to the oscillation 10 shown in dashed lines. The electronic looping means are constituted by servo-control which would maintain the operating point at 0 in the absence of any dither.

This solution is satisfactory for relatively low velocities. However it gives rise to reset frequencies f that are proportional to velocity. The invention seeks in particular to provide a gyroscope capable of limiting the reset frequency of the sawtooth at high velocities without degrading angular resolution.

To this end, the invention provides a gyroscope of the above-defined type, characterized by means for reversing the slope of the phase shift sawtooth, i.e. changing the sign of the regulating phase $\phi_r$, as soon as $\phi_r$ exceeds $+\pi/2$ or $-\pi/2$, and by means for algebraically summing the changes in the sign of the sawtooth.

By virtue of this disposition, the reset frequency of the sawtooth is never greater than $\tfrac{1}{4}\tau$, which is favorable given that the reset switching of the sawtooth may disturb detection.

The algebraic summing means may be constituted merely by an up/down counter. The means for changing the sign of the regulating phase are advantageously designed to perform this change, i.e. to reverse the slope of the sawtooth, during the periods that resetting is taking place, i.e. during the short instants required for detection purposes.

The invention will be better understood on reading the following description of a particular embodiment given by way of non-limiting example. The description refers to the accompanying drawings, in which:

above-described FIG. 1 is a graph showing phase variation as a function of angular velocity for a non-servocontrolled gyroscope;

Figure 1:
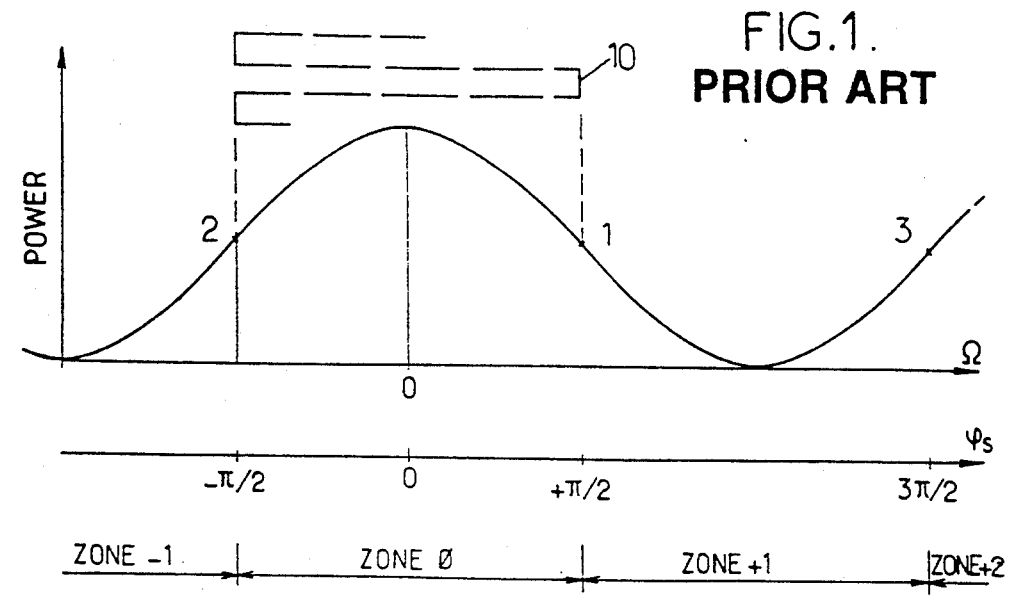
Figure 2:
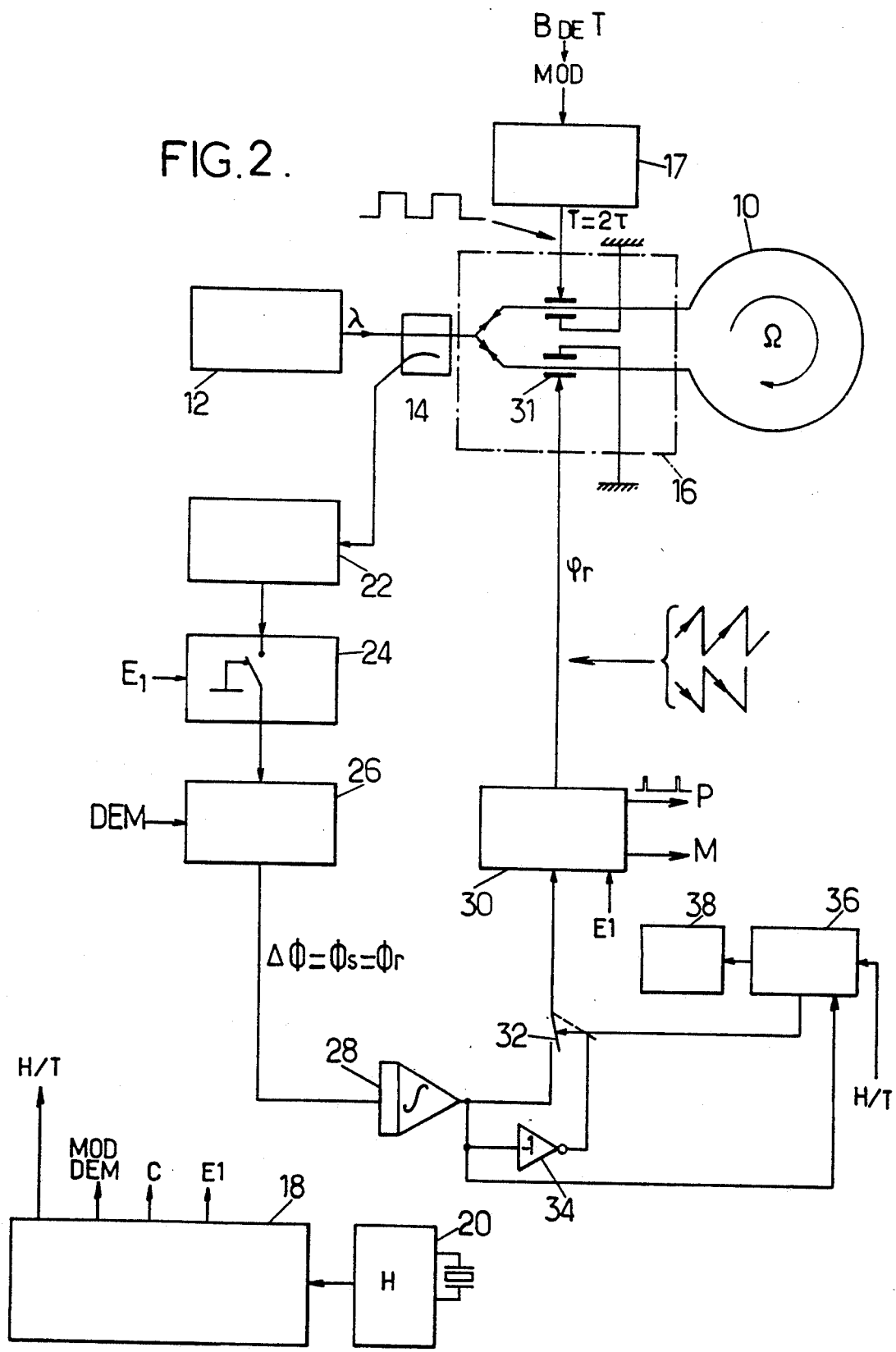
FIG. 2 is a block diagram of an optical fiber gyroscope whose general structure is known but modified to enable the invention to be implemented.

The general structure of the gyroscope shown in FIG. 2 is known and consequently described only briefly. It comprises a dielectric waveguide 10 in the form of a ring, generally constituted by a coil of monomode optical fiber that may be 100 meters to 1000 meters long and having a radius of about 1 centimeter. A source of linearly polarized coherent light 12 such as a laser diode feeds both ends of the fiber via an integrated optics assembly 16. A tapping device 14 placed between the source 12 and the integrated optics enables the power provided by the waves that have travelled in opposite directions round the ring waveguide 10 to be picked up. The integrated optics assembly includes a splitter sending equal power to each of the two ends of the fiber. It also includes electro-optical phase modulator means receiving a periodic electrical signal from a modulator circuit 17, which signal alternates with a period that is about double the time $\tau$ required for travelling round the ring (with variations in said time being negligible with varying angular velocity $\Omega$), and at an amplitude such as to cause $\pi/2$ switching of the optical phase, as indicated by dashed lines in FIG. 1.

This signal brings the measurement points into zones where sensitivity and linearity are greatest. In a known type of gyroscope, the operating point thus alternates between 1 and 2.

The periodic signal may, in particular, be a squarewave and synchronized on a signal MOD coming from a time base 18 which receives a fixed frequency signal from a clock 20.

The product of the interference between the contrarotating waves that have travelled round the coil is applied by the tapping device 14 to a measurement and looping system. The system shown comprises a detection, preaplification, and impedence-matching module 22 followed by an analog switch 24 and a demodulator 26. These modules receive a control signal $E_1$ and a reference signal DEM from the time base 18.

The demodulated DC signal which constitutes a different signal $\Delta\phi = \phi_s + \phi_r$ is applied to an integrator feeding a slope control input of an analog sawtooth generator 30. The output from the generator 30 is applied to one of the electrooptical phase shifter means 31 placed at one of the ends of the ring. In FIG. 2, the phase shifter means 31 are distinct from the modulation phase shifter and they are placed at the opposite end of the ring. However they could be placed at the same end and they could be constituted by the same means.

In known gyroscopes, the generator 30 is designed to provide a pulse on a P output or on an M output, depending on the direction of slope of the sawtooth, on each reset to zero (whenever the sawtooth reaches an amplitude corresponding to an optical phase shift of $2\pi$ in known gyroscopes).

The frequency of the pulses on the P output or on the M output is then representative of the angular velocity, with each pulse corresponding to a given angle of rotation $\theta = n\lambda_0/2R$; giving $$\Omega = \lambda_0 n f / 2R \qquad (1)$$

where f is the pulse frequency at M or P.

In accordance with the invention, the slope of the sawtooth is reversed depending on when the absolute value of the regulating phase $\phi_r$ exceeds $\pi/2$. As shown in FIG. 2, this inversion may be performed simply, in particular by inverting the gain at the output from the integrator 28, where a switch 32 (generally constituted by a solid state element) makes it possible to connect the integrator 28 to the sawtooth generator 30 either directly or else via an inverter 34. The servo-control then brings the oscillation to the zone 1 (FIG. 1), with the modulation signal then causing the operating point to alternate between 1 and 3.

Inversion may be controlled by a comparison and control logic circuit 36 whose output is applied to an up/down counter 38 whose function is described below.

So long as the phase $\phi_s$ remains between $+\pi/2$ and $+3\pi/2$, the operating point alternates in the zone $+1$ between the points 1 and 3. If $\phi_s$ exceeds $3\pi/2$, then gain is inverted again, returning to what it was in zone 0. The operating point then oscillates in the zone $+2$.

The changes in the sign of the gain starting from zone 0 are recorded, each time together with a flag indicating whether the change was caused by exceeding $+\pi/2$ or $-\pi/2$. If the content of the up/down counter 38 that sums gain inversions is written N, then the velocity $\Omega$ is given by:

$$\Omega = N\lambda_0 c_0 / 4(LR) + (\lambda_0 n f / 2R)$$

which replaces above equation (1).

It can be seen that the frequency of the sawtooth is thus limited to $f = \pm \frac{1}{4}\tau$, with the angular resolution remaining unchanged and equal to $n\lambda_0/2R$.

Figure 4:
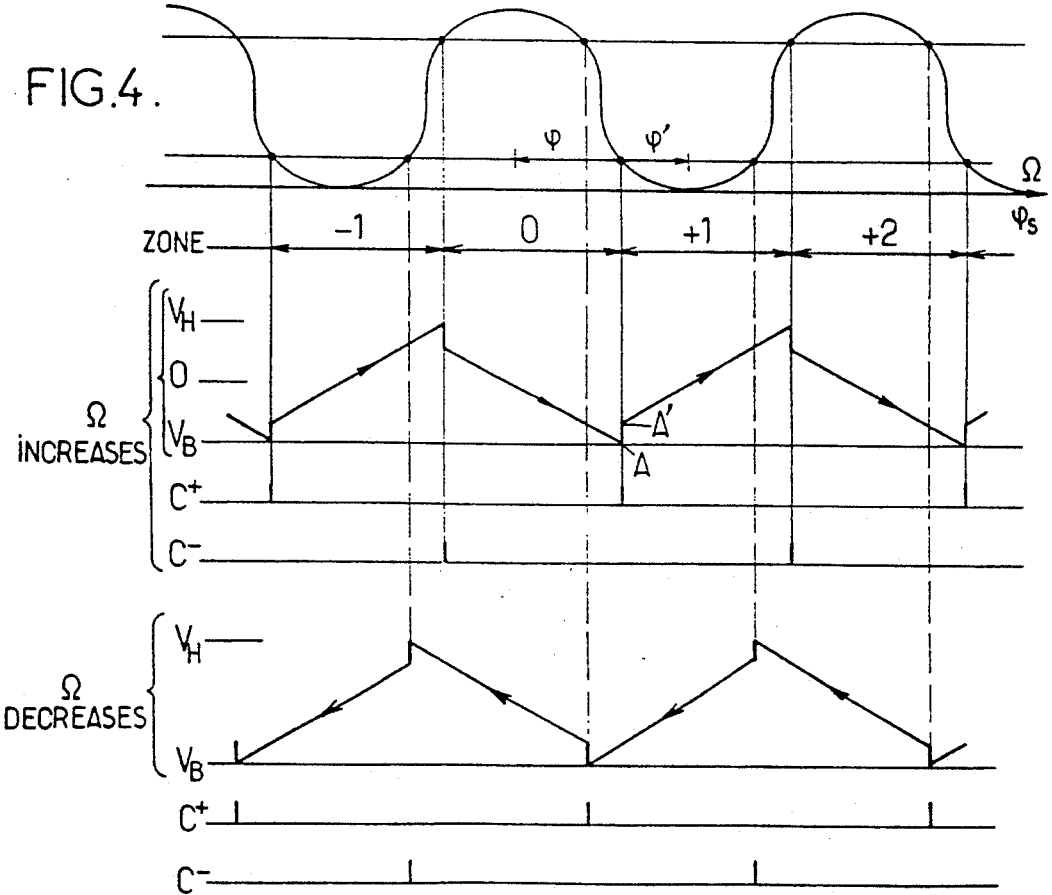
FIGS. 4 and 5 are waveform diagrams for the signals that appear at various points in the block diagrams of FIGS. 3 and 4.

By way of example, FIG. 4 shows one possible way in which the output from the integrator 28 may change as a function of the input velocity when implementing the invention, for two particular cases, one of which corresponds to an increasing velocity and the other of which corresponds to a decreasing velocity. This diagram corresponds to the case which is preferable from the operating point of view where sawtooth inversions are performed during resets to zero, by means of a circuit of the kind shown in FIG. 3.

Figure 3:
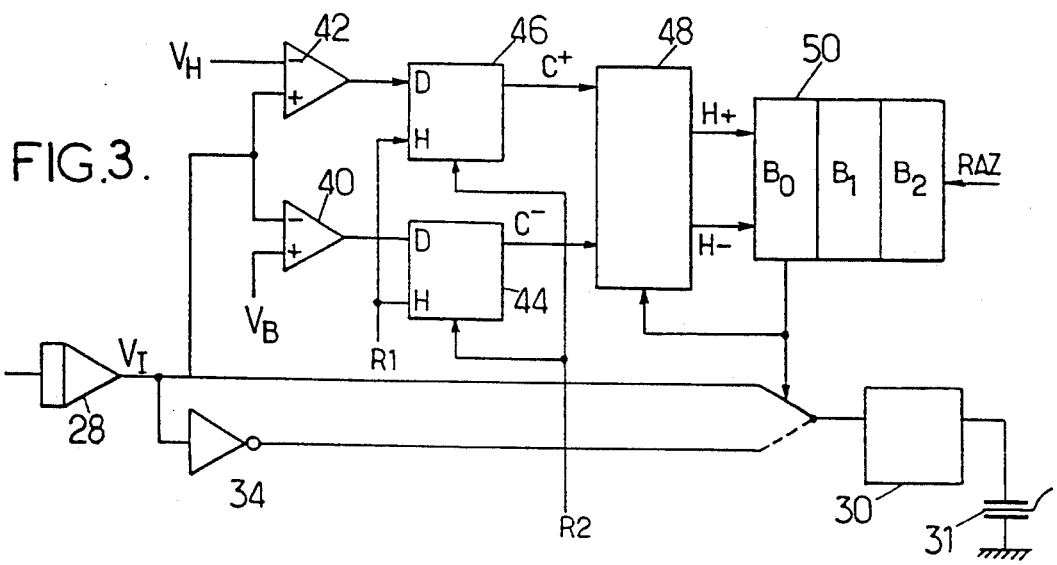
FIG. 3 is a block diagram showing one possible structure for a sawtooth generator in a particular embodiment of the invention.
Figure 5:
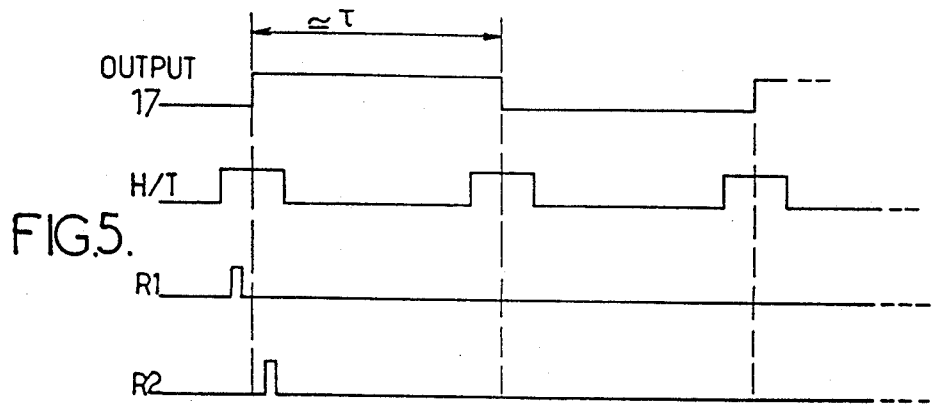
Figure 6:
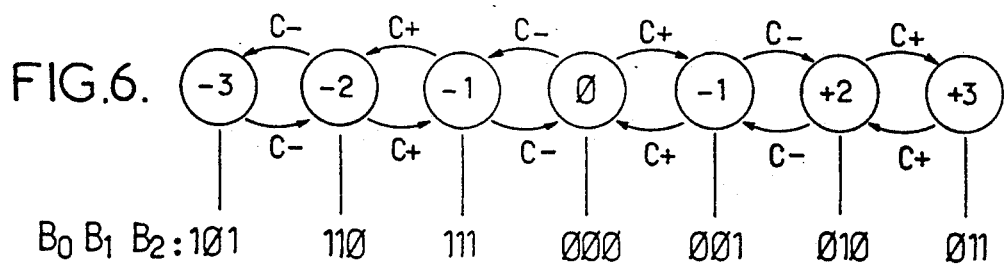
FIG. 6 is an operating diagram.

The comparison and control logic circuit may be constituted as shown diagrammatically in FIG. 3. This logic circuit operates as shown in the diagram of FIG. 6 and the signals then have the waveforms shown in FIG. 5 where each line shows the signal corresponding to the point having the same reference in FIG. 3.

The comparison and control logic circuit of FIG. 3 comprises two input comparators 40 and 42 which receive substantially equal reference voltages $V_H$ and $V_B$, respectively on a negative input and on a positive input. The threshold values $V_H$ and $V_B$ correspond to phase shifts $\phi_s$ due to the Sagnac effect and slightly greater than $\pi/2$ so as to give rise to the timing diagram shown in FIG. 4. When the output voltage $V_I$ from the integrator 28 exceeds $V_H$, which corresponds to an increase in rotary velocity, the comparator 42 provides a signal. Conversely, if $V_I$ becomes sufficiently negative to become less than $-V_B$, then the comparator 40 provides an output signal.

By giving $V_H$ and $V_B$ absolute values that correspond to phase shifts $\phi_s$ slightly greater than $\pi/2$, any risk of oscillation in the gain switching is avoided in the event of the velocity $\Omega$ being close to that which corresponds to the boundaries between zones. This difference gives rise to a reduction in the absolute value of the output voltage from the integrator 28 after each switchover, e.g. from A to A′ while velocity is increasing (FIG. 4).

The phase $\phi_r$ immediately changes in turn from $\phi$ to $\phi'$ in FIG. 4.

Each of the comparators 40 and 42 is followed by a D-type latching bistable 44 and 46 in the embodiment shown. Following the appearance of the signal, at the first clock pulse $R_1$ delivered by the time base 18 (so as to occur slightly before the end of a half cycle in the modulation signal), the bistable 46 delivers a pulse C+. A pulse C− is similarly delivered by the bistable 44 in response to any signal from the comparator 40. The bistables are reset to zero by a signal $R_2$ immediately following the end of each half cycle in the modulation signal (FIG. 5). In the case shown, $R_1$ and $R_2$ are emitted during periods when the signal H/T is at a level that prevents tracking and causes the most recent detection to be stored. The duration of this level must be not less than twice the maximum difference between $\tau$ and the modulation half period.

A logic circuit 48 receives the pulses C+ and C− and responds thereto by providing up count pulses H+ and down count pulses H− on two respective outputs in compliance with the following table:

$$H+ = (C+ \cdot \overline{B_0}) + (C- \cdot B_0)$$

$$H+ = (C+ \cdot \overline{B_0}) + (C- \cdot B_0)$$

where $B_0$ is the least significant bit of a counter 50 which sums the output pulses. This case corresponds to using two's complement arithmetic.

The operating diagram is then as shown in FIG. 6 where the bottom line gives the contents of the counter, assuming that it has a maximum capacity of 111 and that operations are performed in two's complement.

The embodiment described above is generally analog in structure. It is also possible to implement it in digital form starting from the output of the demodulator 26.

We claim:

1. A gyroscope comprising:
   a coiled dielectric waveguide constituting a ring and having two ends;
   a source of electromagnetic waves provided with a splitter connected to said ends of the dielectric waveguide for sending two contra-rotating waves from said source into said ring;
   an interference detector connected to receive said contra-rotating wave after they have circulated in said ring;
   first electro-optical means optically coupled with said dielectric waveguide and controlled to impart a periodic alternating and symmetrical phase modulation to said electromagnetic waves at a period which is substantially twice the travel time of said electromagnetic waves in said ring, said first electrooptical means being located upstream from the ring for one of said contrarotating waves and downstream of said ring for the other contra-rotating waves;
   second electro-optical means located upstream from the ring for one of said contra-rotating waves and downstream of the ring of the other;
   a phase shift sawtooth generator connected to deliver voltage ramps of controllable slope and controllable polarity to said second electro-optical means;
   electronic means connected to said interference detector and constructed to be responsive to a phase difference between said contra-rotating waves received by said interference detector;
   means for reversing said polarity of said ramps whenever said phase difference exceeds $+\pi/2$ or is beyond $-\pi/2$; and
   means for algebrically summing said changes of polarity of said ramps.

2. A gyroscope according to claim 1, characterized in that the algebraic summing means are constituted by an up/down counter.

3. A gyroscope according to claim 1, characterized in that the means for reversing the slope of the sawtooth are designed to reverse the slope during periods when the sawtooth is being reset to zero.

4. A gyroscope according to claim 1, wherein the algebraic summing means comprise:
   two input comparators receiving respective reference voltages representing phase shifts in opposite directions of slightly more than $\pi/2$;
   a logic circuit controlled by the comparators; and
   an up-down counter;
   said logic circuit being arranged and connected to provide the up-down counter with up pulses H+ and with down pulses H− in response to outlet pulses C+ and C− received from the respective comparators, and in dependance of the least significant bit $B_o$ in the counter, in accordance with the following table:

$$H+ = (C+ \cdot \overline{B_o}) + (C- \cdot B_o)$$

$$H- = (C+ \cdot B_o) + (C- \cdot \overline{B_o}).$$

5. A gyroscope according to claim 4, characterized in that bistable latches are interposed between the comparators and the logic circuit.

* * * * *